(12) United States Patent
Arvidsson et al.

(10) Patent No.: US 9,071,951 B2
(45) Date of Patent: Jun. 30, 2015

(54) METHOD FOR ASSOCIATING A TRACKING AREA IDENTITY LIST WITH A USER EQUIPMENT IN A WIRELESS COMMUNICATIONS NETWORK

(75) Inventors: Åke Arvidsson, Solna (SE); Attila Mihály, Dunakeszi (HU); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 184 days.

(21) Appl. No.: 13/877,554

(22) PCT Filed: Oct. 11, 2010

(86) PCT No.: PCT/SE2010/051095
§ 371 (c)(1),
(2), (4) Date: Apr. 3, 2013

(87) PCT Pub. No.: WO2012/050491
PCT Pub. Date: Apr. 19, 2012

(65) Prior Publication Data
US 2013/0203415 A1    Aug. 8, 2013

(51) Int. Cl.
*H04W 4/00*    (2009.01)
*H04W 8/16*    (2009.01)
(Continued)

(52) U.S. Cl.
CPC .............. *H04W 8/16* (2013.01); *H04W 60/00* (2013.01)

(58) Field of Classification Search
CPC ....... H04W 60/00; H04W 8/16; H04W 68/00; H04W 8/205; H04W 60/04
USPC ...................................... 455/435.1
See application file for complete search history.

(56) References Cited

U.S. PATENT DOCUMENTS

2008/0220782 A1   9/2008  Wang et al.
2009/0270111 A1*  10/2009  Nakamura et al. ......... 455/456.1
(Continued)

FOREIGN PATENT DOCUMENTS

EP    2 129 141 A1    12/2009
EP    2 180 729 A1    4/2010
(Continued)

OTHER PUBLICATIONS

International Search Report, Application No. PCT/SE2010/051095, Jul. 13, 2011.
(Continued)

*Primary Examiner* — Timothy Pham
(74) *Attorney, Agent, or Firm* — Myers Bigel Sibley & Sajovec, P.A.

(57) ABSTRACT

A method comprises: associating a first tracking area identity list with a user equipment during registration with a core network node; sending the first tracking area identity list to the user equipment; and receiving at least one tracking area identity comprising the tracking area identity of a tracking area being used by the user equipment. The method further comprising: compiling an second tracking area identity list based on the tracking area identity list currently associated with the user equipment and on the received at least one tracking area identity; and in response to the second tracking area identity list containing a different set of tracking area identities than the tracking area identity list currently associated with the user equipment, sending the second tracking area identity list to the user equipment to replace an earlier tracking area identity list.

18 Claims, 5 Drawing Sheets

(51) Int. Cl.
*H04W 60/00* (2009.01)
*H04W 36/00* (2009.01)
*H04W 24/00* (2009.01)

(56) References Cited

U.S. PATENT DOCUMENTS

2010/0029298 A1* 2/2010 Iwamura et al. ............ 455/456.1
2010/0227627 A1* 9/2010 Ishii et al. ................... 455/456.2
2010/0255840 A1 10/2010 Itamiya et al.
2010/0255841 A1* 10/2010 Kubo et al. ................. 455/435.1

FOREIGN PATENT DOCUMENTS

| WO | WO 2008/112161 A2 | 9/2008 |
| WO | WO 2008/146868 A1 | 12/2008 |
| WO | WO 2010/071545 | 6/2010 |
| WO | WO 2012/050492 | 4/2012 |

OTHER PUBLICATIONS

Written Opinion of the International Searching Authority, Application No. PCT/SE2010/051095, Jul. 13, 2011.
CATT: "Number of TAIs in TAI list", 3GPP Draft; C1-100490_TAI_NUMBER_R9, 3rd Generation Partnership Project (3GPP) Mobile Competence Centre: 650, Route des Lucioles; F-06921 Sophia-Antipolis Cedex; France, vol. CT WG1, no. San-Francisco; 2010-0222, Mar. 1, 2010; XP050408553, 5 pp., Cover Page: Reason for change.
Mitsubishi Electric: "Self-optimization of assigned TA list from reported list of last visited TAs", 3GPP Draft; S2-073219, 3rd Generation Partnership Project (3GPP), Mobile Competence Centre ; 650, Route des Lucioles ; F-06921 Sophia-Antipolis Cedex; France, vol. CT WG1, no. Kobe, Japan; 20070926, Sep. 26, 2007, XP050026822, 5 pp., the whole document.
A. Norefors, et al.: "Methods and arrangements for setting up and using at least one primary tracking area identifier" U.S. Appl. No. 61/138,274, filed Dec. 17, 2008.
Gonzalez, et al. "Understanding individual human mobility patterns" Nature Publishing Group; doi:10.1038/nature06958; vol. 453; Jun. 5, 2008, pp. 779-782.
Krashakov, et al. "On the universality of rank distributions of website popularity" Computer Networks: The International Journal of Computer and Telecommunications Networking; vol. 50 Issue 11, Aug. 10, 2006; pp. 1769-1780. Elsevier North-Holland, Inc. NY.
J. Shim, P. Scheuermann, and R. Vingralek, "Proxy Cache Algorithm: Design, Implementation, and Performance," *IEEE Trans. Knowledge and Data Eng.*, vol. 11, No. 4, pp. 549-562, Jul./Aug. 1999.
U.S. Appl. No. 13/140,262, filed Jun. 16, 2011, Norefors et al.
U.S. Appl. No. 13/823,318, filed Mar. 14, 2013, Mihály et al.

* cited by examiner

METHOD FOR ASSOCIATING A TRACKING AREA IDENTITY LIST WITH A USER EQUIPMENT IN A WIRELESS COMMUNICATIONS NETWORK

CROSS REFERENCE TO RELATED APPLICATION

This application is a 35 U.S.C. §371 national stage application of PCT International Application No. PCT/SE2010/051095, filed on 11 Oct. 2010, the disclosure and content of which is incorporated by reference herein in its entirety. The above-referenced PCT International Application was published in the English language as International Publication No. WO 2012/050491 A1 on 19 Apr. 2012.

TECHNICAL FIELD

The invention relates to a method for associating a tracking area identity list with a user equipment in a wireless communications network. The present invention also relates to a core network node for associating a tracking area identity list with a user equipment in a wireless communications network and a computer program product for the same.

BACKGROUND

Registrations of current (location/routing/tracking) area are used to inform the cellular network where the mobile subscriber currently is attached. This information is used to limit the number of cells used for paging of the subscriber user equipment (UE). Without registrations all cells must be paged, the latter approach does not scale. On the other hand the registrations cause signaling load as well. This means that the network must be configured to balance between registration and paging load.

The 3$^{th}$ Generation Partnership Project Evolved Packet System (3GPP EPS or System Architecture Evolution/Long Term Evolution, SAE/LTE) system introduces the possibility to provide the user equipment with individual information (a so-called Tracking Area (TA) list which can comprise multiple tracking area identities (TAIs)) on when to register to the network. The network will page the user equipment in all the Tracking Areas that are on the TA list. Thus, as long as the user equipment moves between the Tracking Areas on the TA list, it does not need to notify the network of its new location (for example, by performing a Tracking Area Update). Note that this list of TAIs is sometimes referred to as a TA list and sometimes referred to as a TAI list. A mobility management entity (MME) can allocate a new TA list to a user equipment in conjunction with some EMM (EPS Mobility Management) procedures like Attach, Tracking Area Update (TAU) and GUTI (Globally Unique Temporary Identity) Reallocation. Note that although a GUTI Reallocation procedure normally is performed in conjunction with another mobility management procedure, for example, as part of a TAU or Attach procedure, it can in principle be performed any time while the user equipment is in EMM-REGISTERED state (i.e. when there is an EMM context in the UE). This means that an MME may allocate a new TA list to a user equipment any time while the user equipment is in EMM-REGISTERED state.

Too much signaling, both for registrations (tracking area updates) and paging causes system signaling load. Therefore, there is a need for finding solutions to reduce the signaling load in the network. If the signaling load is reduced also cost for network nodes are reduced.

SUMMARY

An object of the invention is to provide a method and a network node for reducing load in a wireless communication network due to tracking area update requests and/or paging.

According to an aspect of the invention, the object is achieved by a method for use in a core network node, such as a mobility management entity (MME), in a wireless communication network for associating a tracking area identity list comprising at least one tracking area identity (TAI) with a user equipment, the method comprising the steps of: associating a first tracking area identity list with a user equipment as the user equipment registers with the core network node; sending the first tracking area identity list to the user equipment; receiving at least one tracking area identity comprising the tracking area identity of a tracking area being used by the user equipment; compiling an second tracking area identity list based on the tracking area identity list currently associated with the user equipment and on the received at least one tracking area identity; in case the second tracking area identity list contains a different set of tracking area identities than the tracking area identity list currently associated with the user equipment, sending the second tracking area identity list to the user equipment to replace an earlier tracking area identity list in the user equipment; and associating the second tracking area identity list with the user equipment in place of the tracking area identity list currently associated with the user equipment.

According to another aspect of the invention, the object is achieved by a core network node in a wireless communications network associating a tracking area identity list comprising at least one tracking area identity (TAI) with a user equipment, the core network node comprising a processing unit configured to associate a first tracking area identity list with a user equipment as the user equipment registers with the core network node; send the first tracking area identity list to the user equipment; receive at least one tracking area identity comprising the tracking area identity of a tracking area being used by the user equipment; compile an second tracking area identity list based on the tracking area identity list currently associated with the user equipment and on the received at least one tracking area identity; in case the second tracking area identity list contains a different set of tracking area identities than the tracking area identity list currently associated with the user equipment, send the second tracking area identity list to the user equipment to replace an earlier tracking area identity list in the user equipment; and associate the second tracking area identity list with the user equipment in place of the tracking area identity list currently associated with the user equipment.

According to a further aspect of the invention, the object is achieved by a computer program product for use in a core network node in a wireless communications network for associating a tracking area identity list comprising at least one tracking area identity (TAI) with a user equipment, which comprises computer readable code means, which when run in a processing unit in the core network node causes the core network node to perform the steps of: associating a first tracking area identity list with a user equipment as the user equipment registers with the core network node; sending the first tracking area identity list to the user equipment; and receiving at least one tracking area identity comprising the tracking area identity of a tracking area being used by the user equipment; compiling an second tracking area identity list based on the tracking area identity list currently associated with the user equipment and on the received at least one tracking area identity; in case the second tracking area identity list contains a different set of tracking area identities than the tracking area identity list currently associated with the user equipment, sending the second tracking area identity list to the user equipment to replace an earlier tracking area identity list in the user equipment; and associating the second tracking area identity list with the user equipment in place of the tracking area identity list currently associated with the user equipment.

Since these individually and dynamically adapted tracking area identity lists indicate one or more tracking areas in which each user equipment currently may be located, possibly located in the one or more tracking areas by a relatively high probability, a page for a user equipment in the one or more tracking areas in its tracking area identity list will most likely result in a positive page response. If no positive page response is received for one or a subset of the tracking areas in the tracking area identity list, for example, a first tracking area identity occurring in the tracking area identity list, another one or subset of the tracking areas in the tracking area identity list may be paged, for example, the next tracking area identity occurring in the tracking area identity list, etc. As a result of these individually and dynamically adapted tracking area identity lists, fewer tracking areas need to be paged and less tracking area update requests need to be sent, thereby yielding a reduced overall signaling load for paging and hence reduced interference.

Also, by continuously associating a tracking area identity list that is based on the user equipment's current and preceeding location in terms of tracking area identities to a user equipment in the wireless communications network as described above, the tracking area identity lists may be individually and dynamically adapted to each user equipment in the wireless communications network in a manner which avoids the disadvantages of long-term collection and storage of subscriber specific historical data in terms of complexity, storage requirements and MME synchronization. In other words, the invention utilizes short term mobility data to derive tracking area identity lists that are adapted per individual user equipment.

Consequently, this also provides for the individually adapted tracking area identity lists to be created and maintained with a substantially low degree of complexity and storage of user specific information.

Another advantage of the invention is that the embodiments of the invention may be implemented in an existing wireless communication system, such as an EPS network, without changes to the signaling procedures between the user equipment and the core network node, such as an MME, for tracking area update procedures and paging procedures.

Further features of, and advantages with, the invention will become apparent when studying the following description. Those skilled in the art realize that different features of the present invention may be combined to create embodiments other than those described in the following.

BRIEF DESCRIPTION OF THE DRAWINGS

The objects, advantages and effects as well as features of the invention will be more readily understood from the following detailed description of exemplary embodiments of the invention when read together with the accompanying drawings, in which.

ABBREVIATIONS

Figure 1:
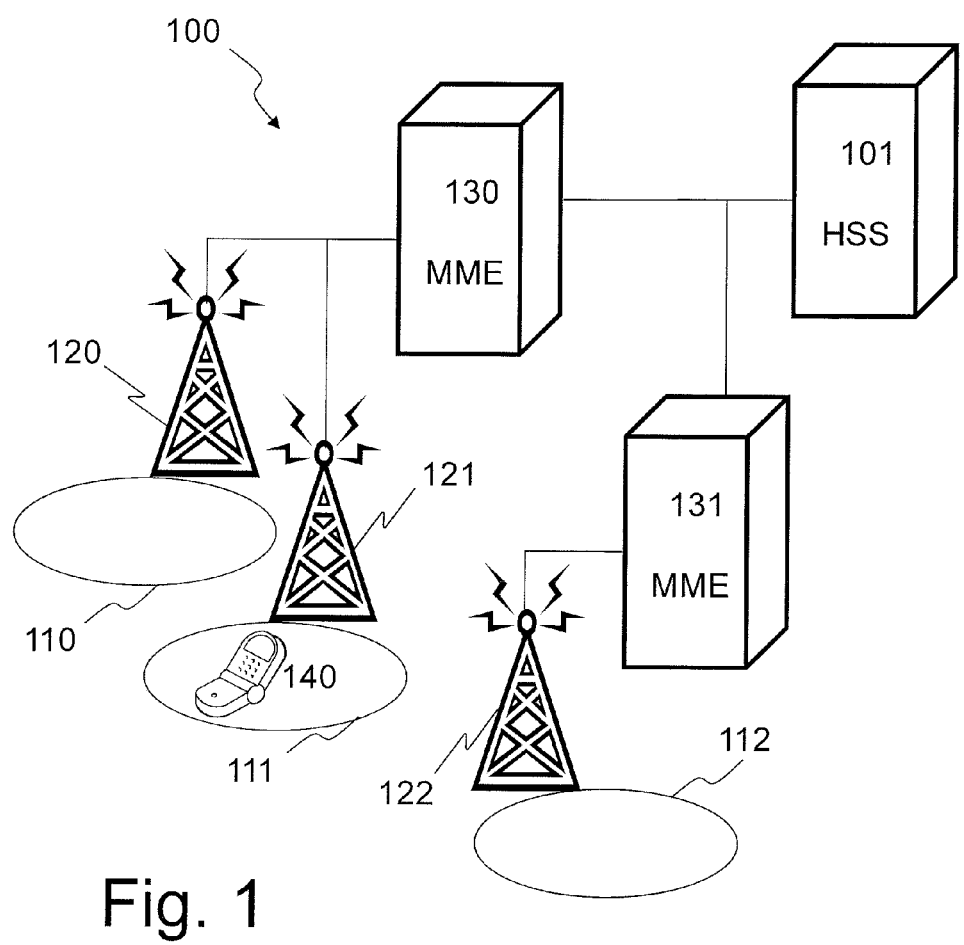
FIG. 1 shows a schematic exemplifying system in which the invention may be applied.

EMM EPS Mobility Management
eNB eNodeB
EPS Evolved Packet System
E-UTRAN Evolved Universal Terrestrial Radio Access Network
GUTI Globally Unique Temporary Identity
IE Information Element
LTE Long Term Evolution
MME Mobility Management Entity
NAS Non Access Stratum
OSS Operation and Support System
O&M Operation and Management
S1AP S1 Application Protocol (The control plane protocol used between an eNB and an MME.)
SAE System Architecture Evolution
TA Tracking Area
TAI Tracking Area Identity
TAU Tracking Area Update
UE User Equipment

DESCRIPTION

Throughout the following description similar reference numerals have been used to denote similar elements, parts, items or features, when applicable. It may be noted that the expression "user equipment" (UE) includes, but is not limited to, a mobile terminal, a mobile phone, a personal digital assistant, a mobile station, a portable computer equipped with suitable transceivers, a stationary computer equipped with suitable transceivers and the like.

FIG. 1 shows a schematic overview of a wireless communication network 100. The wireless communication network 100 may comprise a Home Subscriber Server (HSS) 101, a Mobility Management Entity (MME) 130, 131, a radio network node 120, 121, 122 and a user equipment (UE) 140. The radio network node 120, 121, 122, such as a radio base station network node, is served by the MME 130, 131. Each radio base station network node 120, 121, 122 is associated with at least one cell 110, 111, 112. Furthermore, a tracking area identifier (also referred to as tracking area identity or TAI) is associated with at least one cell 110, 111, 112. The HSS 101 and the MME 130, 131 may also be referred to as core network nodes 101, 130, 131. Hence, in the following, when referring to a core network node, the expression "core network node" is to be understood as primarily meaning any one of the HSS 101 and the MME 130, 131. However, the expression "core network node" is to be understood to also extend to cover other central network entity nodes, such as, Operation and Management nodes (O&M), Operation and Support System nodes (OSS), or shared database nodes (may be used for synchronisation of common data in MME pools).

Figure 2:
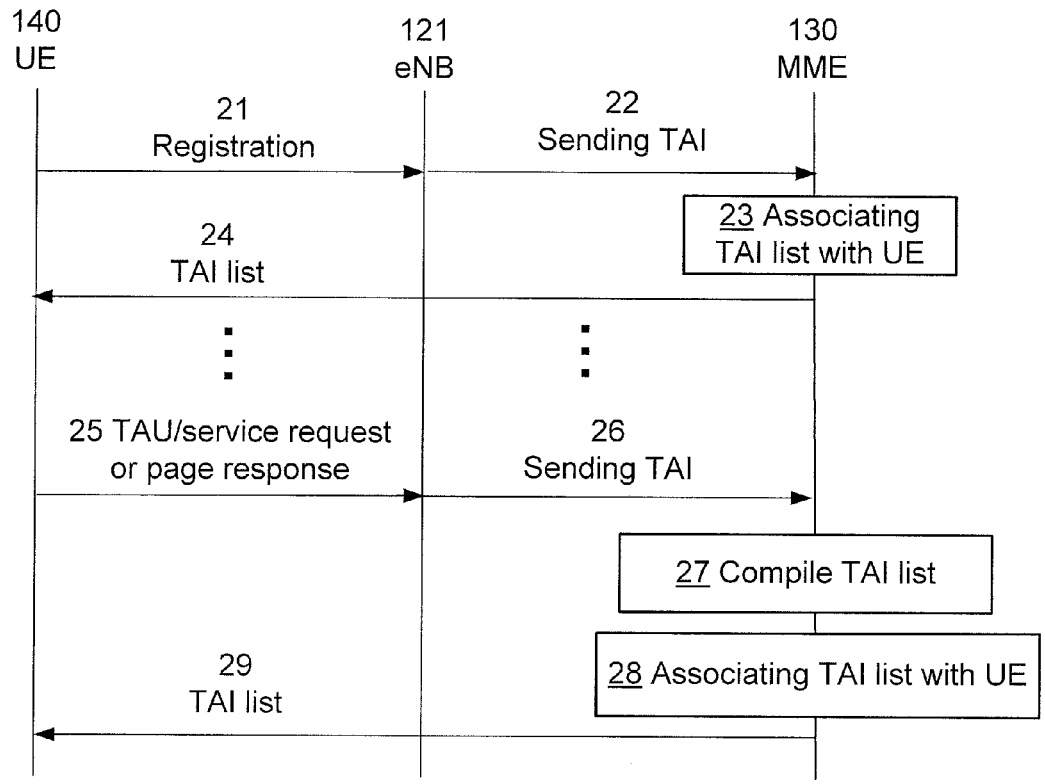
FIG. 2 shows a schematic, combined signalling and flow chart of an embodiment of the method according to the invention applied in the system according to FIG. 1.

FIG. 2 shows a schematic, combined signalling and flow chart of an embodiment of a method according to the invention applied in the wireless communications network 100 in FIG. 1 for associating a tracking area identity list (or TAI list) comprising at least one tracking area identity (TAI) with a UE 140.

In a step 21, the UE 140 sends a registration message using an Attach or TAU procedure. In a step 22, the radio network node 120, 121, 122 sends a TAI associated with the current cell of the UE 140 to the MME 130, when forwarding a message from the UE 140, in conjunction with the Attach or TAU signalling that registers the UE 140 with the MME 130. In a step 23, in case UE 140 was not previously registered in the MME 130 or another core network node, there is no TAI list associated with the UE 140 in the MME 130. The MME 130 may therefore associate an initial TAI list with the UE 140. However, in case UE 140 previously has been registered in the MME 130, a TAI list may already be associated with the UE 140 in the MME 130, whereby this TM list may be used as the initial TM list for the UE 140. In a step 24, the MME 130 may send the initial TAI list to the registered UE 140.

In a step 25, the registered UE 140 sends a TAU request, a service request or a page response. In a step 26, the radio network node 120, 121, 122 sends a TAI associated with the current cell of the registered UE 140 to the MME 130, when forwarding a message from the UE 140, in conjunction with, for example, a tracking area update, a service request or a page response or a combination thereof. In a step 27, the MME 130 may upon receiving a TAI associated with the current cell of the registered UE 140, wherein for example the received TAI may not be present in the TAI list currently associated with the registered UE 140 in the MME 130, compile a new TAI list to be associated with the registered UE 140 based on the TAI list currently associated with the UE 140 (for example, the initial TM list) and on the newly received TAI. In a step 28, the MME 130 may associate the reconfigured TAI list with the registered UE 140 in place of the TAI list currently associated with the UE 140. In a step 29, the MME 130 may send the new reconfigured TAI list to the registered UE 140. This may be performed in case the new TAI list contains a different set of TAIs than the TAI list currently associated with the UE 140.

It should be noted that the signalling described above may, for example, be supported by a NAS IE and two S1AP IEs. The NAS IE is the "Last visited registered TAI" IE which, if available in the UE 140, may be comprised in messages between the UE 140 and the MME 130 (forwarded to the MME 130 by the radio network node 121), such as, for example, a NAS Attach Request message or a NAS Tracking Area Update Request message. The two S1AP IEs are the TAI IE and the E-UTRAN CGI IE, which both pertain to the current cell of UE 140. These may both be comprised in messages between the radio network node 121 and the MME 130 and thus transport NAS messages to the MME 130, such as, for example, a S1AP INITIAL UE MESSAGE message or a S1AP UPLINK NAS TRANSPORT message.

Figure 3:
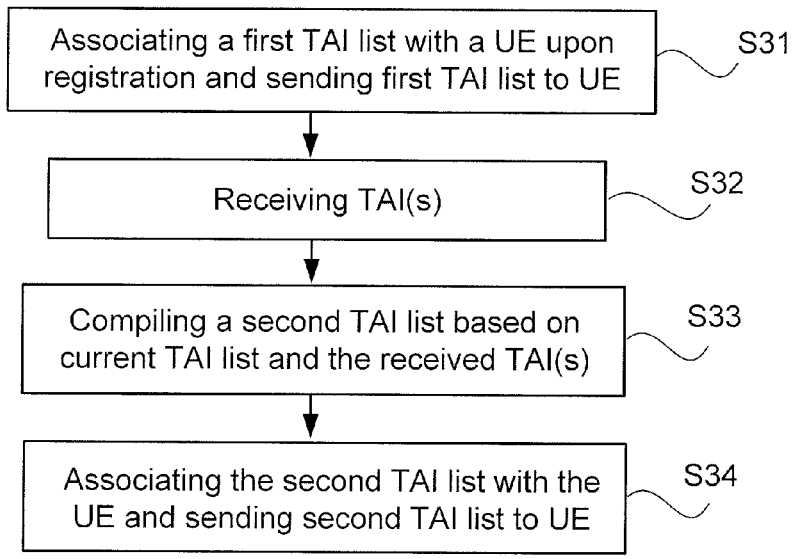
FIG. 3 shows a schematic flow chart of an embodiment of the method in a core network node according to the invention.

FIG. 3 shows a schematic flow chart of the method in a core network node, such as an MME 130, 131 or a HSS 101, etc., for associating a TAI list comprising at least one TAI with a UE, wherein a wireless communication network, such as an EPS network, comprises the core network node. The following steps may be performed.

In step S31, the core network node may associate a first TAI list with a UE as the UE registers with the core network node. The core network node may here also send this first TAI list to the registerering UE. Upon registering the UE in the core network node, the core network node may compile this first/initial TAI list such that it comprises the TAI of the TA which the UE is currently using, and one or more TAIs of TAs that are adjacent to the TA in which the UE is currently located. Alternatively, in case the UE previously has been registered in the core network node or another core network node, a TM list may already be associated with the UE in the core network node. This may, for example, be an old TM list stored in the core network node or a TM list received from another previous core network node in which the UE has previously been registered. The core network node may also be configured to retrieve such an existing TAI list previously associated with the UE from another core network node and associate this existing TM list with the UE as the initial TM list for the UE. As in the previous case, the TAI list must here also comprise the current TAI of the UE (i.e. the TAI of the cell in which the UE is currently located).

Furthermore, the core network node may limit the number of TAIs in the initial TAI list to a predetermined number of TAIs, $n_1$. A prerequisite for efficient utilization of the TAI list is that the average TA size, that is, the average number of cells comprised in a TA as well as the average geographical coverage area, is significantly smaller than would be the case in a wireless communications network not using TAI lists, that is, for example, a wireless communications network using TAI lists that always consists of a single TAI. Such small average TA sizes imply that a suitable average-sized TAI list would consist of a relatively small number of TAIs. For example, for a semi-mobile UE, a suitable average-sized TAI list may comprise about five TAIs. This allows a smoother geographical distribution of TAI list coverage for UEs that are moving in big groups, such as, for example, together on a train, which distributes the TAUs for these UEs in time and may thus efficiently avoid excessive TAU peaks. In this manner, so called "ping-pong" TAUs may also be efficiently reduced. Thus, in this respect, the total signalling load and interference caused by TAUs and paging may be minimized or at least significantly reduced by limiting the number TAIs in the initial TAI list to a relatively small number of TAIs. According to one example, an initial TAI list may be compiled by the core network node for a UE such that it comprises a predetermined number of TAIs that is the expected ideal number of TAIs for the particular TA in which the UE is currently located. An expected ideal number of TAIs may, for example, be determined based on the overall subscriber mobility pattern observed at a given location or on the number of TAIs that the TAI list would or should contain when the TAI list reconfiguration (step S33) described below has reached a steady, and therefore presumably ideal, number of TAIs in the TAI lists.

It should also be noted that the preferred TAI list size to be maintained for a UE in the core network node may be preset or dynamically configured depending on the mobility and paging frequency of the UE. In the latter case, a high mobility by the UE would imply a larger preferred TAI list, whereas a high paging frequency of the UE would imply a smaller preferred TAI list. In general the preferred TAI list size may be chosen so as to minimize the total load (and interference) caused by TAU and paging procedures. This may, for example, be performed by minimizing the following mathematical equation, Eq. 1:

$$L_{T+P}(M,S,N,A_C,P) = L_T \times f_T(M,S,N,A_C) + L_P \times P_f \times S \times N \quad \text{(Eq. 1)}$$

with respect to S, where
$L_T$ is the load caused by a TAU procedure,
$L_P$ is the load caused by a page in a single cell, M is a function reflecting the mobility behavior (comprising, for example, speed), S is the size of the TAI list (i.e. the number of the TAIs in the TAI list), N is the average number of cells in a TAI list, $A_C$ is the average coverage area of a cell, $P_f$ is the paging frequency and $f_T$ is the TAU frequency in the shape of a function of M, S, N and $A_C$.

In step S32, the core network node may receive one or more TAIs of one or more TAs associated with the cells being used by the registered UE. This may, for example, occur when the registered UE sends a signalling message that forms a part of an existing signalling event occurring between the UE and the core network node as a consequence of regular operation. Examples of such a signalling message may comprise, but is not limited to, a TAU request, a service request or a page response. For each occasion the steps S32-S34 may be repeated.

In step S33, the core network node may compile a second TAI list based on the TAI list currently associated with the registered UE in the core network node and on the newly received TAI(s). The TAI list currently associated with the registered UE in the core network node may, for example, be the first TAI list or any other TAI list previously associated with the registered UE in the core network node. When compiling the second TAI list, the TAI of the TA currently being used by the registered UE may be added to the the TAI list currently associated with the registered UE in the core network node in order to form the second TAI list. In this case, another TAI may also be removed from this compiled second TAI list. Upon removing a TAI from the second TAI list, the TAI of the TAIs in the second TAI list which is associated with the least recently used TA may be removed. The least recently used TA may be determined as the TA for which the longest time period has elapsed since the last indication that the TA was used by the UE was received by the core network node. In this case, if the TA currently used by the UE and/or the last visited TA is determined as the TA for which the longest time period has elapsed since an indication was received by the core network node that the TA was used by the UE, the timer(s) for the TAI of the TA currently used by the UE and/or for the TAI of the last visited TA may instead be restarted in the second TAI list. This ensures that these TAIs are always comprised in the UE's TAI list.

Alternatively, the least recently used TA may be determined by maintaining an order of the TAIs in the second TAI list. In case of such an ordered second TAI list, the TAI of a TA is added as the first occurring TAI in the second TAI list upon receiving an indication that the TA is currently being used by the UE and where the TAI of this TA is not already present in the TAI list currently associated with the registered UE in the core network node. If the TAI of the TA currently being used by the registered UE is already comprised in such an ordered second TAI list, the TAI of the TA currently being used by the registered UE may be moved to the front of the ordered second TAI list. Consequently, the TA associated with the TAI that is the last TAI in the ordered second TAI list may be determined as the least recently used TA. In this case, if the TAI of the TA currently used by the UE and/or the TAI of the last visited TA is removed from the ordered second TAI list, the TAI of the TA currently used by the UE and/or the TAI of the last visited TA may instead be re-added to the ordered second TAI list. This ensures that these TAIs are always comprised in the UE's TAI list.

The removal of a TAI from the TAI list may, for example, also be performed when a TAI is added to the second TAI list such that the number of TAIs in the second TAI list exceeds a predetermined number (for example, $n_1$) of TAIs in the second TAI list. This ensures a constant maximum number of TAIs in the second TAI list.

An indication that a TA is currently being used by a UE may be any suitable information received by the core network node which is enough for the core network node to determine that a particular TA is currently being used by a UE. In a signal or message to the core network node, an indication that a TA is currently being used by a UE may be, but is not limited to, one or more of the following examples: an indication, in the form of a TAI, of the TA currently being used by the UE; an indication, in the form of a radio cell identifier, of the radio cell currently being used by the UE and which cell identifier the core network node can translate to the TAI of the TA which the radio cell belongs to; an indication of the radio network node being used by the UE, in the form of any signalling message pertaining to the UE being received by the core network node from the radio network node, wherein the core network node knows which TA the radio cell(s) of the radio network node belong(s) to; or an indication, in the form of a TAI, of the TA last visited by the UE of the TAs whose associated TAIs are comprised in the second TAI list.

In step S34, after compiling the second TAI list for the UE, the core network node may associate the second TAI list with the registered UE in place of an earlier TAI list that was associated with the UE in the core network node. The core network node may here also send the second TAI list to the registered UE. This may be performed in case the second TAI list contains a different set of TAIs than the earlier TAI list that was associated with the UE in the core network node.

An advantage of having individually and dynamically adapted TM lists that are continously built up and reconfigured in a manner as described in the embodiments above is that, since these TM lists inherently provide more distributed TAUs than fixed or collectively assigned TAI lists, this counteracts TAU peaks at certain TA borders.

In some embodiments, the method may further comprise a step where the removal of a TAI from the TM list currently associated with the UE is triggered to be performed by the fact that no indication has been received by the core network node that the TA associated with the TAI has been used by the registered UE for a predetermined period of time $t_1$. That is, upon the expiry of a predetermined period of time $t_1$ for a given TAI, the steps S33-S34 may be repeated to create a third TM list, wherein the step S33 removes the TAI for which the predetermined period of time $t_1$ has expired from the TAI list currently associated with the UE. This may allow individually and dynamically adapted TAI lists to shrink to a single TAI for stationary UEs, and thus provide an even lower degree of complexity and storage of user specific information in the core network node. After the expiration of the predetermined period of time $t_1$ the core network node may postpone performing steps S33 and/or S34 until the next existing signalling event occurring between the UE and the core network node as a consequence of regular operation occurs with the UE, for example, a reply to a service request from the UE, in order not to introduce additional signalling messages for the sole purpose of updating the TAI list. As the occurrence of such an existing signalling event is detected, the third TAI list may be comprised in a signalling message which forms a part of the existing signalling event.

It should be understood that the removal of a TAI from a TAI list may in certain embodiments be performed based on any combination of the different ways of removing a TAI from a TAI list described above. For example, a removal of a TAI in an ordered TAI list may be performed in combination with a time based removal, such as, removing a TM from a ordered TM list when no indication that the TA associated with the TAI is being used by the UE has been received by the core network node for a predetermined period of time. According to this example, a TM would be removed from the end of the ordered TAI list when the number of TAIs in the ordered TM list exceeds a predetermined limit, but a TAI would also be removed from the ordered TM list upon the expiry of a predetermined period of time for that TAI, for example, if a timer governing the TAIs removal expires. The latter may be performed irrespective of the number of TAIs in the ordered TAI list (as long as at least one TAI remains in the ordered TAI list after the removal).

In some embodiments of the method in the core network node, the method may further comprise a step wherein the reconfigured TAI list for a UE is discarded when the UE is no longer registered with the core network node. Alternatively, the method may further comprise steps wherein the reconfigured TAI list for the UE is stored for a predetermined period of time $t_2$ after the UE is no longer registered with the core network node, and the reconfigured TAI list for the UE is discarded upon the expiry of the predetermined period of time $t_2$. This may enable the step S31 to further comprise the step of associating the stored reconfigured TAI list with the UE, if a UE re-registers with the core network node before the expiry of the predetermined period of time $t_2$. This may be particularly useful if the UE after de-attaching/de-registering from the core network node soon thereafter re-attaches/re-registers in the same core network node. It may also be useful in anticipating later requests for this information from other core network nodes in which the UE may be registered.

In some embodiments of the method in the core network node, the method may further comprise a step wherein information in the reconfigured TAI list is conveyed to another core network node before the reconfigured TAI list is discarded or before the expiry of the predetermined period of time $t_2$. This may enable the step S31 to further comprise the step of retrieving an existing TAI list previously associated with the UE which comprises the TAI of the TA that is currently being used by the UE from another core network node. Since the reconfigured TAI list associated with a UE herein is based on the UE's current and preceding locations in terms of TAIs, the currently associated TAI list of a UE would typically not be transferred to another core network node in case of, for example, a MME relocation or MME pool switch, because this information would conventionally not be useful in the another core network node serving different eNBs and thus covering a different area. However, if an overlapping MME pool feature is used, then the information may be useful if the MME relocation occurs when the UE is located in an MME pool overlapping zone, that is, in cells which are served by both the old and the new MME. The information to be transferred between the core network nodes may comprise all of the information (that is, the entire TM list and/or further UE context information in the MME) or may be limited to information only pertaining to TAs in the overlapping zone of two MME pools. Such a context transfer alternative may for example be implemented by specifying one or multiple new IEs in the GTPv2-C Forward Relocation Request message, the GTPv2-C Context Response message and/or the GTPv2-C Identification Response message. Alternatively, the Context IE for the core network node context (for example, the MME context IE in the case the core network node is an MME) may be extended to comprise also TM lists and/or further UE context information. In the latter case, another alternative is to use the Private Extension IE in the same messages.

Figure 4:
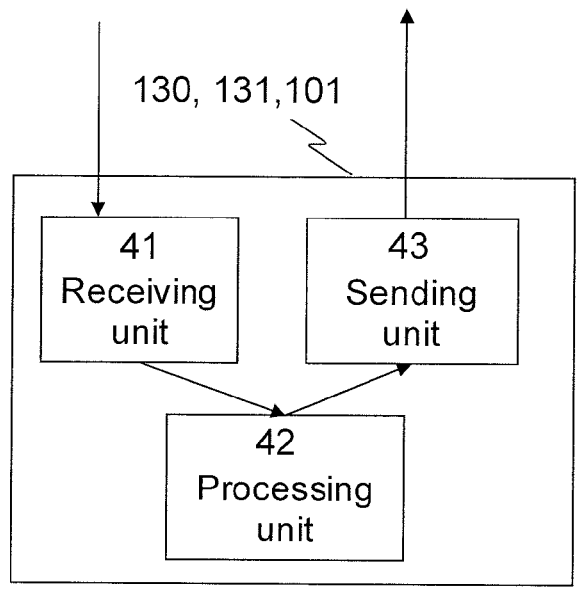
FIG. 4 shows a schematic block diagram of an embodiment of a core network node according to the invention.

FIG. 4 shows a schematic block diagram of an embodiment of the core network node 130, 131, 101 for associating a TAI list comprising at least one TAI with a UE. The core network node 130, 131, 101 comprises a processing unit 42 configured to associate a TAI list with a UE as the UE registers with the core network node. Furthermore, the processing unit 42 in the core network node 130, 131, 101 is configured to receive a TAI of a TA used by the registered UE, an compile a new TAI list based on the TAI list currently associated with the UE in the core network node and the received TAI, and associate the new TAI list with the registered UE in place of the TAI list earlier associated with the UE in the core network node. Optionally, the core network node 130, 131, 101 may also comprise a receiving unit 41 and a sending unit 43.

Furthermore, the processing unit 42 may be connected to the receiving unit 41 and the sending unit 43. The processing unit 42 may be arranged to receive information from the receiving unit 41 indicating the TAI of a TA currently being used by a UE, wherein the TAI of the TA may or may not be present in, if existing, the current associated TAI list for the UE. The processing unit 42 may also be configured to send information about previously registered UEs to other core network nodes using the sending unit 41. This may, for example, be performed upon request from another core network node.

It should be noted that the processing unit 42 may comprise logic for performing the functionality of the core network node 130, 131, 101. This functionality may be implemented by means of a software or computer program. The processing unit 42 may also comprise storage means or a memory unit for storing the computer program and processing means, such as, for example, a microprocessor, for executing the computer program. The storage means may also be readable storage medium separated from, but connected to the processing unit 42. When, in the following, it is described that the core network node 130, 131, 101 performs a certain action or function it is to be understood that the processing unit 42 in the core network node 130, 131, 101 may use its processing means to execute a certain part of the software or computer program which is stored in its storage means. The processing unit 42 in the core network node 130, 131, 101 may be configured to perform the actions or functions described in the steps according to the embodiments of the method as described with reference to FIGS. 2-3 and/or FIGS. 5-8.

Figure 5:
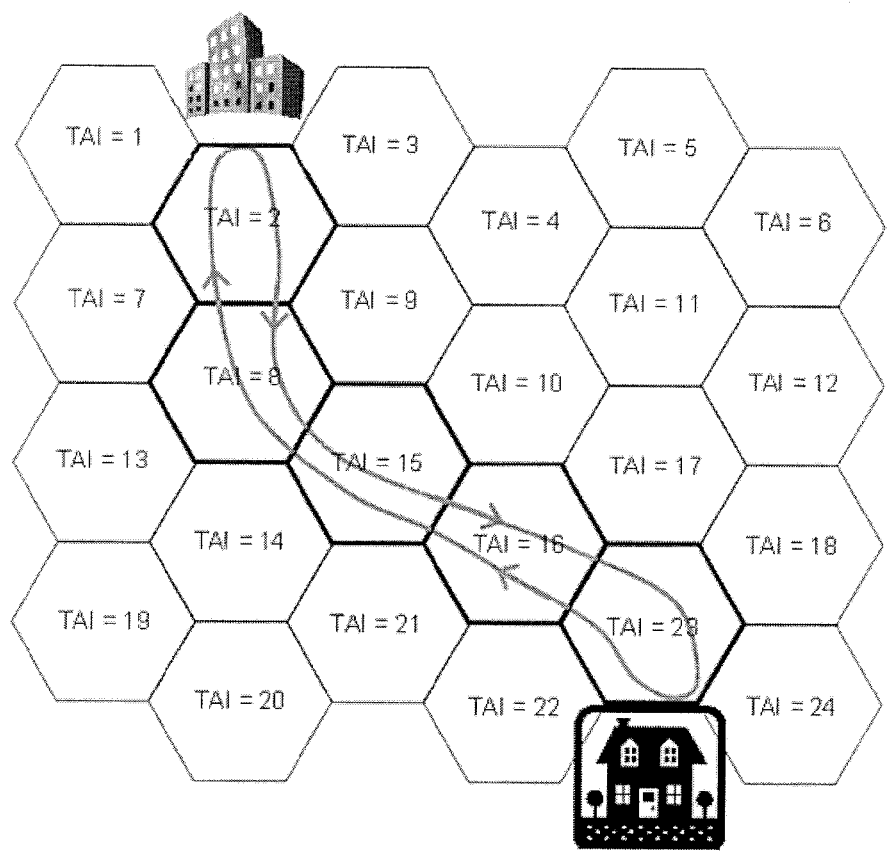
FIG. 5 shows a schematic illustration of an example of a mobility pattern exhibited by a user equipment in the system according to FIG. 1.

FIG. 5 shows an illustration of a UE exhibiting a regular mobility pattern through various TAs and the resulting individual and dynamic TM list that may be produced by the method and the core network node according to the embodiments described herein. In this example, the UE's TAI list may at different times comprise one, several or all of the TAIs of the TAs through which the UE has passsed, i.e. TAI=23, TAI=16, TAI=15, TAI=8, and TAI=2.

Figure 6:
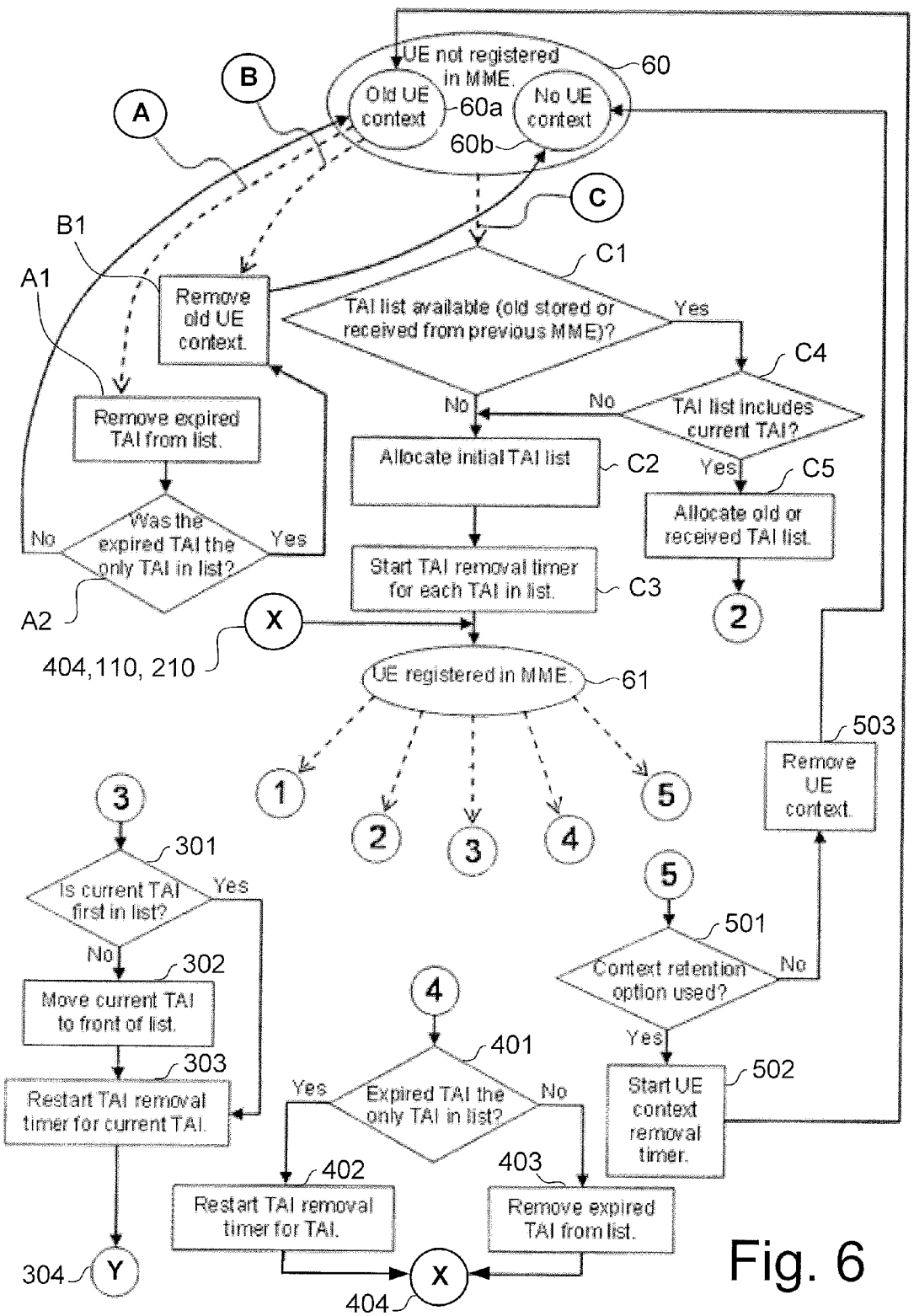
FIG. 6 shows a schematic flow chart of an embodiment of the method in the core network node according to the invention.
Figure 7:
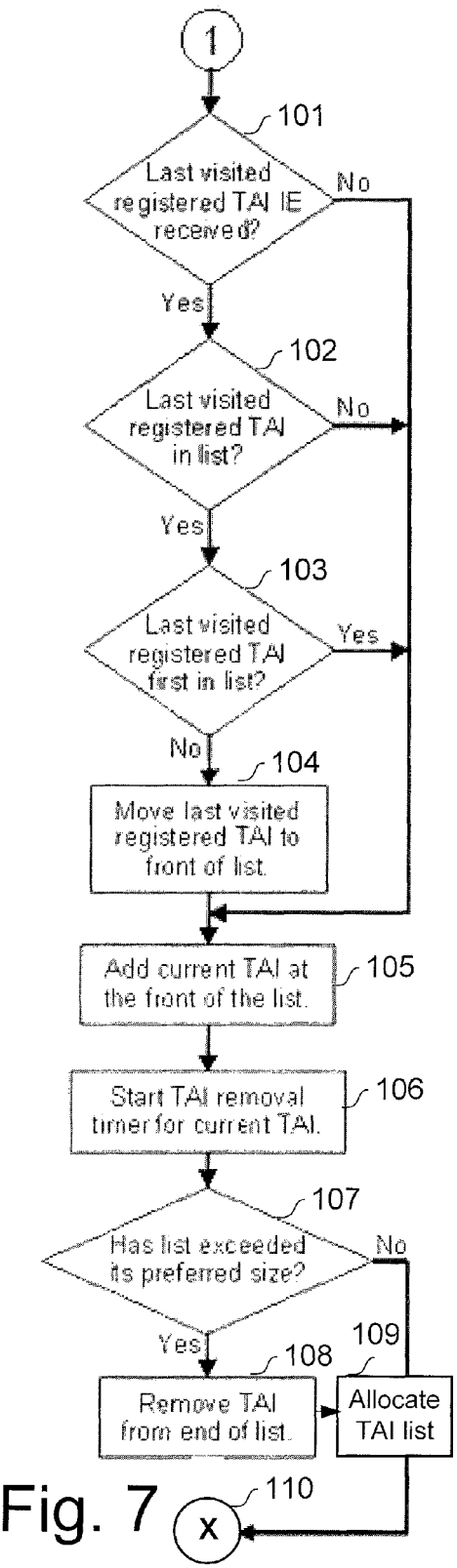
FIG. 7 shows a schematic flow chart forming a part of the schematic flow chart in FIG. 6.
Figure 8:
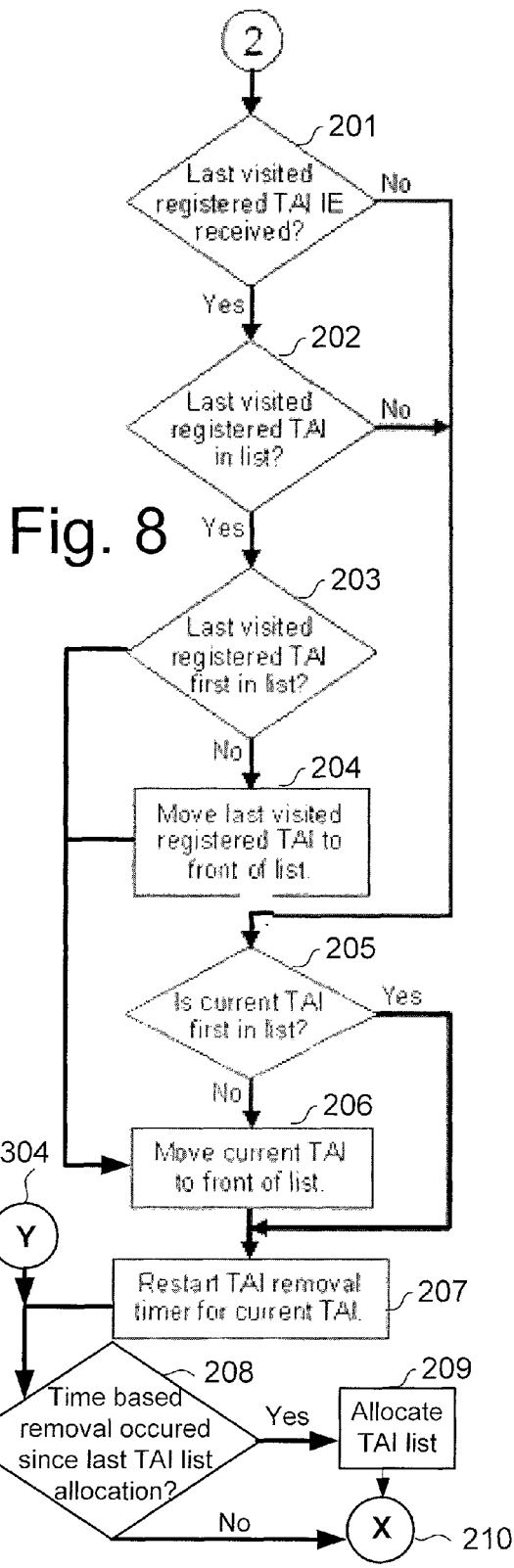
FIG. 8 shows a schematic flow chart forming a part of the schematic flow chart in FIG. 6.

FIG. 6, complemented by FIG. 7 and FIG. 8, shows a schematic flow chart of an exemplary embodiment of the method in the core network node 130, 131, 101. In this exemplary embodiment, the core network node 130, 131, 101 is Mobility Management Entity (MME).

Furthermore, in this embodiment, the removal of a TM from a TAI list is performed based on the removal of TAIs in an ordered TAI list in combination with a time based removal as previously described in one of the examples above with reference to FIG. 3. It should also be noted that, in reading the following, the expressions "allocate initial TAI list" or "allocate TAI list", are to be understood as comprising both associating the TM list with a UE in the core network node, as well as, sending the TAI list to the UE, such that the UE may replace its previous TAI list with this new TM list.

A UE may either not be registered in the MME (60) or be registered in the MME (61). First, in case a UE is not registered in the MME, the MME may comprise either no UE context (60b) or an old UE context (60a) for the non-registered UE. The UE context for the non-registered UE may comprise a TAI list, TAI removal timers, an old UE context removal timer and further collected data. Here, either of the events A, B or C may trigger further action in the MME (as indicated by dashed arrows in FIG. 6).

Event A—A TAI Removal Timer Expires

Here, a TAI removal timer expires for a TM comprised in an old UE context (60a) in the MME associated with a non-registered UE.

In step A1, the MME removes the TAI from the TAI list for which the TM removal timer has expired. In step A2, the MME may check whether or not the removed TAI was the only TAI in the TM list. In case the removed TM was not the only TM in the TAI list, the old UE context (60a) for the non-registered UE in the MME is maintained in the MME. In step B1, in case the removed TAI was the only TAI in the TAI list, the MME may remove the old UE context (60a) for the non-registered UE in the MME. Subsequently the MME will comprise no UE context (60b) for the non-registered UE.

Event B—An Old UE Context Removal Timer Expires

Here, an old UE context removal timer for the old UE context (60b) of the non-registered UE expires. In step B1, the MME may remove the old UE context (60a) for the non-registered UE in the MME. Subsequently the MME will comprise no UE context (60b) for the non-registered UE.

Event C—A UE Registers with the MME Using an Attach or TAU Procedure

In step C1, the MME may check whether or not a TAI list is already associated with the registering UE. In step C2, in case no previous TAI list is associated with the registering UE, the MME may compile and allocate an initial TAI list with the registering UE. In step C3, the MME may start TAI removal timers for each TAI in the initial TAI list. The MME may then go on and register the UE in the MME (61).

In step C4, if a TAI list is already associated with the registering UE in step C1, that is, if for example an old UE context (60a) comprising a TM list for the registering UE is maintained in the MME or is retrievable from another MME, the MME may check whether or not the already associated TAI list comprises the TM of the TA currently used by the registering UE. In step C2, if the already associated TAI list does not comprise the TAI of the TA currently used by the registering UE, the MME may compile and allocate a new initial TM list with the registering UE. In step C5, if the already associated TM list do comprises the TM of the TA currently used by the registering UE, the MME may associate this already associated TM list with the registering UE. In this case, the MME may then perform the steps 201-210 as described with reference to FIG. 8 below.

Secondly, in case a UE is or becomes registered in the MME (61), either of the events 1-5 may trigger further action in the MME (as indicated by dashed arrows in FIG. 6).

Event 1—Regular TAU or Attach Message is Received in the MME from the Registered UE In case of receiving an Attach message, the UE may have internally deregistered itself from the MME without actually being deregistered in the MME. Here, the MME may then perform the steps 101-110 as described with reference to FIG. 7 below.

In step 101 in FIG. 7, the MME may check if the regular TAU or Attach message comprises a last visited registered TM IE. If the regular TAU or Attach message does not comprise a last visited registered TM IE, the MME may go directly to step 105 and add the TAI of the TA currently used by the UE to the front of the UE's TAI list. In step 102, if the regular TAU or Attach message comprises a last visited registered TAI IE, the MME may check whether or not the received last visited registered TAI is comprised in the UE's TAI list. If the received last visited registered TAI IE is not comprised in the UE's TAI list, the MME may go directly to step 105 and add the TAI of the TA currently used by the UE to the front of the UE's TAI list. In step 103, if the received last visited registered TAI is comprised in the UE's TAI list, the MME may check whether or not the received last visited registered TAI is the first TAI at the front of the UE's TAI list. If the received last visited registered TAI is the first TAI at the front of the UE's TAI list, the MME may go directly to step 105 and add the TAI of the TA currently used by the UE to the front of the UE's TAI list. In step 104, if the received last visited registered TAI is not the first TAI at the front of the UE's TAI list, the MME may move the last visited registered TAI to the front of the UE's TAI list. In step 105, the MME may add the TAI of the TA currently used by the UE to the front of the UE's TAI list. In step 106, the MME may start a TAI removal timer the TM of the TA currently used by the UE. In step 107, the MME may check whether or not the UE's TAI list has exceeded its preferred size, i.e. exceeded a predetermined number of TAIs in the TAI list which is the preferred number of TAIs for the UE's TAI list. In step 108, if the UE's TAI list has exceeded its preferred size, the MME may remove the TAI currently located at the bottom or end of the UE's TM list. In step 109, if the UE's TAI list has not exceeded its preferred size or after the removal of the TAI located at the bottom or end of the UE's TAI list in step 108, the MME allocate the new TM list to the UE. In step 110, the MME may return the UE to its registered state in the MME (61), as shown in FIG. 6, and then wait for the next event 1-5 to occur.

Event 2—A periodic TAU Request message is received in the MME from the registered UE Here, the MME may perform the steps 201-208 as described with reference to FIG. 8 below.

In step 201 in FIG. 8, the MME may check if the periodic TAU Request message comprises a last visited registered TAI IE. However, in case the MME arrived at step 201 after step C5 in FIG. 6, the periodic TAU Request message may instead be an Attach Request or a regular TAU Request message. In this case, the Attach Request or a regular TAU Request message is treated in the same manner as described below for the periodic TAU Request message. If the periodic TAU Request message does not comprise a last visited registered TAI IE, the MME may go directly to step 205 and check whether the TAI of the TA currently used by the UE is the first TAI in the front of the UE's TAI list. In step 202, if the periodic TAU Request message comprises a last visited registered TAI IE, the MME may check whether or not the received last visited registered TAI is comprised in the UE's TAI list. If the received last visited registered TAI is not comprised in the UE's TAI list, the MME may go directly to step 205 and check whether the TAI of the TA currently used by the UE is the first TAI in the front of the UE's TAI list. In step 203, if the received last visited registered TAI is comprised in the UE's TAI list, the MME may check whether or not the received last visited registered TAI is the first TAI at the front of the UE's TAI list. If the received last visited registered TAI is the first TAI at the front of the UE's TAI list, the MME may go directly to step 206 and move the TAI of the TA currently used by the UE to the front in the UE's TAI list. In step 204, if the received last visited registered TAI is not the first TAI at the front of the UE's TAI list, the MME may move the last visited registered TAI to the front of the UE's TAI list. In step 205, the MME may check whether the TAI of the TA currently used by the UE is the first TAI in the front of the UE's TAI list. In step 206, if the TAI of the TA currently used by the UE is not the first TM in the front of the UE's TAI list, the MME may move the TAI of the TA currently used by the UE to the front in the UE's TAI list. In step 207, the MME may restart the TAI removal timer for the TAI of the TA currently used by the UE. In step 208, if a time based removal of a TAI has occurred since the last allocation of a TAI list to the UE, the MME may allocate the new TAI list to the UE and then in step 210 return the UE to its registered state in the MME (61), as shown in FIG. 6. However, if a time based removal of a TAI has not occurred since the last allocation of a TAI list to the UE, the MME may in step 210 return the UE directly to its registered state in the MME (61), as shown in FIG. 6, and wait for the next event 1-5 to occur.

Event 3—A Current TAI Indication is Received in the MME from the Registered UE

A current TAI indication may be received in the MME from the registered UE and/or the current radio network node of the registered UE as described above with reference to FIG. 3.

In step 301, the MME may check whether the current TAI is the first TAI in the front of the UE's TAI list. In step 302, if the current TAI is not the first TAI in the front of the UE's TAI list, the MME may move the current TAI to the front in the UE's TAI list. In step 303, if the current TAI is the first TM in the front of the UE's TAI list or after moving the current TAI to the front in the UE's TM list in step 302, the MME may restart the TAI removal timer for the current TAI. In step 304, the MME may then perform the steps 208-210 as described with reference to FIG. 8.

Event 4—A TAI removal timer expires for a TAI in the registered UE's TAI list

In step 401, the MME may check whether or not the TAI for which the TAI removal timer has expired is the only TM in the UE's TAI list. In step 402, if the TAI for which the TAI removal timer has expired is the only TAI in the UE's TAI list, the MME may restart the TAI removal timer for the TAI. In step 403, if the TAI for which the TM removal timer has expired is not the only TAI in the UE's TM list, the MME may remove the TAI for which the TAI removal timer has expired from the UE's TAI list. Here, the MME may allocate the new TAI list to the UE directly, or delay the association of the new TAI list with the UE in the MME and/or delay the sending of the new TM list to the UE until a signalling message forming a part of an existing signalling event occurring between the user equipment and the core network node as a consequence of regular operation has been detected by the MME. The MME may then include the new TAI list in the signalling message to the UE. In step 404, the MME may return the UE to its registered state in the MME (61) and wait for the next event 1-5 to occur.

Event 5—UE Deregisters Itself in the MME

In step 501, the MME may check whether or not any UE context comprising the UE's TM list is to be maintained in the MME for the deregistered UE. In step 502, if the UE context for the deregistered UE is to be maintained in the MME, the MME may start a UE context removal timer for the UE context during which the MME maintains an old UE context (60a) for the deregistered UE. In step 503, if the UE context for the deregistered UE is not to be maintained in the MME, the MME may remove the UE context after which no UE context (60b) is maintained in the MME.

It should be noted that the TAI list, in this exemplary embodiment, maintains the TAIs in a specific order in which the TM of a TA is always added first to the TM list upon receiving an indication that the TA is currently being used by the UE and where the TAI of this TA is not already present in the TAI list currently associated with the UE in the core network node. If the TAI of the TA that is currently being used by the UE is already included in the TAI list when the core network node receives the indication that the TA associated with the TAI is being used by the UE, the core network node may move the TAI to the front of the TAI list in order to maintain a correct order. In addition, in this exemplary embodiment, this removal of TAIs in an ordered TAI list is combined with a time based removal, where a TAI is removed from the TAI list if the core network node has not received any indication that the TA associated with the TAI has been used by the UE for a predetermined period of time. However, other embodiments wherein a clock or timing based ordering of TAIs in the TAI list is used, and/or wherein removal of TAIs in an ordered TAI list is not combined with a time based removal is used and/or wherein only a time based removal is used without having an ordered TAI list, may also be implemented in a similar fashion.

According to further aspects and embodiments, the core network node may further be configured to use permanent storage of TAI lists and short-term historical information for managing the tracking area list in conjunction with the method for reconfiguring and associating a tracking area identity list as described above. In addition to the short-term information and continuously reconfigurable TAI list allocation described above, the short-term historical information and the most recently reconfigured and associated TAI list may be stored in the core network node for longer periods of time or permanently. The advantage of this alternative embodiment is that a TAI list derived during a UE attachment session (or a period when the UE is registered in a particular core network node (for example, a MME)) could be re-used when the UE at a later time re-attaches to the wireless communication network (or re-registers in the same core network node or pool of core network nodes (for example, MMEs) again. In this manner, the movement patterns of the UE do not have to be re-learned.

The short-term historical information and the most recently reconfigured and associated TAI list may be stored by a core network node (for example, an MME) and be made accessible to (or stored in) all other core network nodes (for example, MMEs) in the same core network node (for example, MME) pool. This may be achieved in several ways, for example, by synchronizing the stored information between the core network nodes in a pool. According to another example, the information may be stored in a database unit shared by the core network nodes in a core network node pool. This database unit could be distributed between the core network nodes such that, for example, the core network node which holds the information pertaining to a specific UE can be derived from a hash of the IMSI. Another core network node currently serving the specific UE is then able to retrieve stored information and later store updated information. According to yet another example, the information may be uploaded to a central storage unit from which the information may be downloaded to another core network node in the same core network node pool. Here, an option is to store the information in the HSS, that is, for example, perform an upload in an Cancel Location Ack message from a core network node to the HSS (when the subscriber is deregistered in the core network node) and download to a core network node in an Insert Subscriber Data Request message from the HSS to the core network node (when the UE is registered in the core network node). According to another option, the information may be stored in the O&M system (for example, in the OSS), in which case the communication with the core network nodes may be either synchronous (periodic data transfers) or asynchronous (requests from the core network nodes and/or unsolicited notifications from the O&M system). According to a further option, the information may also be downloaded to another core network node in another, overlapping core network node pool. If the information, or parts of the information, pertain to the overlapping zone between the core network node pools, it will be beneficial to the receiving core network node.

Storing the data in a location that is accessible for all core network control nodes (e.g. MMEs) in the PLMN, for example, the HSS or the O&M system, enables an embodiment wherein only a single TAI list for a UE is maintained. This single TAI list may thus be used by all the core network control nodes in the PLMN. Such a single TAI list may consequently comprise TAIs belonging to different core network node (e.g. MME) pools, but a core network node utilizing the single TM list may be configured to extract and use only the TAIs which belong to the core network node's MME's own core network node pool. This single PLMN-covering TAI list may be part of the UE context that is passed between core network nodes during core network node (e.g. MME) pool changes.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

The invention claimed is:

1. A method for use in a core network node in a wireless communication network for associating a tracking area identity list comprising at least one tracking area identity (TAI) with a user equipment, the method comprising the steps of:
    associating a first tracking area identity list with a user equipment as the user equipment registers with the core network node;
    sending the first tracking area identity list to the user equipment;
    receiving at least one tracking area identity comprising the tracking area identity of a tracking area being used by the user equipment;
    compiling a second tracking area identity list based on the tracking area identity list currently associated with the user equipment and on the received at least one tracking area identity;
    in response to the second tracking area identity list containing a different set of tracking area identities than the tracking area identity list currently associated with the user equipment, sending the second tracking area identity list to the user equipment to replace an earlier tracking area identity list in the user equipment; and
    associating the second tracking area identity list with the user equipment in place of the tracking area identity list currently associated with the user equipment,
    wherein the compiling a second tracking area identity list comprises:
        adding at least one of the received at least one tracking area identity to the first tracking area identity list currently associated with the user equipment; and
        removing a tracking area identity from the first tracking area identity list currently associated with the user equipment, wherein the tracking area identity which is associated with the least recently used tracking area is the tracking area identity that is removed,
    wherein the least recently used tracking area is determined as the tracking area for which the longest time period has elapsed since an indication was received by the core network node that the tracking area was used by the user equipment,
    wherein, in response to, the tracking area currently used by the user equipment and/or the last visited tracking area being determined as the tracking area for which the longest time period has elapsed since an indication was received by the core network node that the tracking area was used by the user equipment, the timer(s) for the tracking area identity of the tracking area currently used by the user equipment and/or for the tracking area identity of the last visited tracking area is restarted in the second tracking area identity list.

2. The method according to claim 1, wherein a tracking area identity is removed from the second tracking area identity list when a tracking area identity is added to the second tracking area identity list such that the number of tracking area identities in the second tracking area identity list exceeds a predetermined number of tracking area identities.

3. The method according to claim 1, wherein a least recently used tracking area is determined by maintaining an order of the tracking area identities in the second tracking area identity list, in which the tracking area identity of a tracking area is added first to the second tracking area identity list upon receiving an indication that the tracking area is being used by the user equipment, and determining the tracking area associated with the tracking area identity that is the last tracking area identity in the second tracking area identity list as the least recently used tracking area.

4. The method according to claim 3, wherein, in response to, the tracking area identity of the tracking area currently used by the user equipment and/or the tracking area identity of the last visited tracking area is removed from the second tracking area identity list, the tracking area identity of the tracking area currently used by the user equipment and/or the tracking area identity of the last visited tracking area is re-added to the second tracking area identity list.

5. The method according to claim 1, wherein associating a first tracking area identity list with a user equipment as the user equipment registers with the core network node comprises compiling an first tracking area identity list comprising the tracking area identity of the tracking area currently being used by the user equipment and one or more tracking area identities of tracking areas adjacent to the tracking area currently being used by the user equipment.

6. The method according to claim 1, wherein associating a first tracking area identity list with a user equipment as the user equipment registers with the core network node comprises retrieving an existing tracking area identity list previously associated with the user equipment comprising the tracking area identity of the tracking area currently being used by the user equipment.

7. The method according to claim 6, wherein retrieving an existing tracking area identity list previously associated with the user equipment comprises retrieving the existing tracking area identity list from a storage medium within the core network node.

8. The method according to claim 6, wherein retrieving an existing tracking area identity list previously associated with the user equipment comprises retrieving the existing tracking area identity list from another core network node in which the user equipment has previously been registered.

9. A method for use in a core network node in a wireless communication network for associating a tracking area identity list comprising at least one tracking area identity (TAI) with a user equipment, the method comprising the steps of:
- associating a first tracking area identity list with a user equipment as the user equipment registers with the core network node;
- sending the first tracking area identity list to the user equipment;
- receiving at least one tracking area identity comprising the tracking area identity of a tracking area being used by the user equipment;
- compiling a second tracking area identity list based on the tracking area identity list currently associated with the user equipment and on the received at least one tracking area identity;
- in response to the second tracking area identity list containing a different set of tracking area identities than the tracking area identity list currently associated with the user equipment, sending the second tracking area identity list to the user equipment to replace an earlier tracking area identity list in the user equipment;
- associating the second tracking area identity list with the user equipment in place of the tracking area identity list currently associated with the user equipment;
- in response to no indication having been received by the core network node that a tracking area associated with a tracking area identity comprised in the tracking area identity list currently associated with the user equipment has been used by the user equipment for a first predetermined period of time, compiling a third tracking area identity list by removing the tracking area identity from the tracking area identity list currently associated with the user equipment;
- sending the third tracking area identity list to the user equipment to replace an earlier tracking area identity list in the user equipment; and
- associating the third tracking area identity list with the user equipment in place of the tracking area identity list currently associated with the user equipment.

10. The method according to claim 9, wherein the step of associating the third tracking area identity list with the user equipment and/or the step of sending the third tracking area identity list to the user equipment is delayed until a signalling message forming a part of an existing signalling event occurring between the user equipment and the core network node as a consequence of regular operation is detected, whereby the third tracking area identity list is included in the signalling message to the user equipment.

11. The method according to claim 9, further comprising the step of:
- discarding the second or third tracking area identity list for the user equipment when the user equipment is no longer registered with the core network node.

12. The method according to claim 11, further comprising the step of:
- conveying information in the second or third tracking area identity list to another core network node before discarding the second or third tracking area identity list or before the expiry of the second predetermined period of time.

13. The method according to claim 9, further comprising the steps of:
- storing the second or third tracking area identity list for a second predetermined period of time after the user equipment is no longer registered with the core network node, and
- upon the expiry of the second predetermined period of time, discarding the second or third tracking area identity list for the user equipment.

14. The method according to claim 13, wherein in response to a user equipment re-registering with the core network node before the expiry of the second predetermined period of time, associating the stored second or third tracking area identity list with the user equipment.

15. A method for use in a core network node in a wireless communication network for associating a tracking area identity list comprising at least one tracking area identity (TAI) with a user equipment, the method comprising the steps of:
- associating a first tracking area identity list with a user equipment as the user equipment registers with the core network node;
- sending the first tracking area identity list to the user equipment;
- receiving at least one tracking area identity comprising the tracking area identity of a tracking area being used by the user equipment;
- compiling a second tracking area identity list based on the tracking area identity list currently associated with the user equipment and on the received at least one tracking area identity;
- in response to the second tracking area identity list containing a different set of tracking area identities than the tracking area identity list currently associated with the user equipment, sending the second tracking area identity list to the user equipment to replace an earlier tracking area identity list in the user equipment;
- associating the second tracking area identity list with the user equipment in place of the tracking area identity list currently associated with the user equipment,
- wherein compiling a second tracking area identity list comprises adding at least one of the received at least one tracking area identity to the first tracking area identity list currently associated with the user equipment, and removing a tracking area identity from the first tracking area identity list currently associated with the user equipment,
- wherein the tracking area identity which is associated with the least recently used tracking area is the tracking area identity that is removed, and
- wherein an indication that a tracking area is being used by a user equipment comprises:
  - an indication, in the form of a tracking area identity, of the tracking area currently being used by the user equipment;
  - an indication, in the form of a radio cell identifier, of the radio cell currently being used by the user equipment and which cell identifier the core network node can translate to the tracking area identity of the tracking area which the radio cell belongs to;
  - an indication of the radio network node being used by the user equipment, in the form of any signalling message pertaining to the user equipment being received by the core network node from the radio network node, wherein the core network node knows which tracking area the radio cell(s) of the radio network node belong(s) to; or
  - an indication, in the form of a tracking area identity, of the tracking area last visited by the user equipment of the tracking areas whose associated tracking area identities are comprised in the second tracking area identity list.

16. A core network node in a wireless communications network associating a tracking area identity list comprising at least one tracking area identity (TAI) with a user equipment, the core network node comprising a processing unit configured to:
- associate a first tracking area identity list with a user equipment as the user equipment registers with the core network node;
- send the first tracking area identity list to the user equipment;
- receive at least one tracking area identity comprising the tracking area identity of a tracking area being used by the user equipment;
- compile an second tracking area identity list based on the tracking area identity list currently associated with the user equipment and on the received at least one tracking area identity;
- in response to the second tracking area identity list containing a different set of tracking area identities than the tracking area identity list currently associated with the user equipment, send the second tracking area identity list to the user equipment to replace an earlier tracking area identity list in the user equipment; and
- associate the second tracking area identity list with the user equipment in place of the tracking area identity list currently associated with the user equipment,
- wherein the compiling a second tracking area identity list comprises:
  - adding at least one of the received at least one tracking area identity to the first tracking area identity list currently associated with the user equipment; and
  - removing a tracking area identity from the first tracking area identity list currently associated with the user equipment, wherein the tracking area identity which is associated with the least recently used tracking area is the tracking area identity that is removed,
- wherein the least recently used tracking area is determined as the tracking area for which the longest time period has elapsed since an indication was received by the core network node that the tracking area was used by the user equipment,
- wherein, in response to, the tracking area currently used by the user equipment and/or the last visited tracking area being determined as the tracking area for which the longest time period has elapsed since an indication was received by the core network node that the tracking area was used by the user equipment, the timer(s) for the tracking area identity of the tracking area currently used by the user equipment and/or for the tracking area identity of the last visited tracking area is restarted in the second tracking area identity list.

17. The computer program product for use in a core network node in a wireless communications network for associating a tracking area identity list comprising at least one tracking area identity (TAI) with a user equipment, the computer program product comprising a non-transitory computer readable storage medium comprises computer readable code, which when run in a processing unit in the core network node causes the core network node to perform the steps of:
- associating a first tracking area identity list with a user equipment as the user equipment registers with the core network node;
- sending the first tracking area identity list to the user equipment;
- receiving at least one tracking area identity comprising the tracking area identity of a tracking area being used by the user equipment;
- compiling an second tracking area identity list based on the tracking area identity list currently associated with the user equipment and on the received at least one tracking area identity;
- in response to the second tracking area identity list containing a different set of tracking area identities than the tracking area identity list currently associated with the user equipment, sending the second tracking area identity list to the user equipment to replace an earlier tracking area identity list in the user equipment;
- associating the second tracking area identity list with the user equipment in place of the tracking area identity list currently associated with the user equipment;
- in response to no indication having been received by the core network node that a tracking area associated with a tracking area identity comprised in the tracking area identity list currently associated with the user equipment has been used by the user equipment for a first predetermined period of time, compiling a third tracking area identity list by removing the tracking area identity from the tracking area identity list currently associated with the user equipment;
- sending the third tracking area identity list to the user equipment to replace an earlier tracking area identity list in the user equipment; and
- associating the third tracking area identity list with the user equipment in place of the tracking area identity list currently associated with the user equipment.

18. The computer program product according claim 17, comprising computer readable code, which when run in the processing unit in the core network node causes the core network node to further perform the steps according to claim 1.

* * * * *

UNITED STATES PATENT AND TRADEMARK OFFICE
CERTIFICATE OF CORRECTION

PATENT NO. : 9,071,951 B2
APPLICATION NO. : 13/877554
DATED : June 30, 2015
INVENTOR(S) : Arvidsson et al.

Page 1 of 3

It is certified that error appears in the above-identified patent and that said Letters Patent is hereby corrected as shown below:

In Column 1, Line 38, delete "3$^{ths}$" and insert -- 3$^{rd}$ --, therefor.

In Column 5, Line 21, delete "this TM" and insert -- this TAI --, therefor.

In Column 5, Line 22, delete "initial TM" and insert -- initial TAI --, therefor.

In Column 5, Line 37, delete "TM" and insert -- TAI --, therefor.

In Column 6, Line 7, delete "TM" and insert -- TAI --, therefor.

In Column 6, Line 9, delete "old TM" and insert -- old TAI --, therefor.

In Column 6, Line 10, delete "a TM" and insert -- a TAI --, therefor.

In Column 6, Line 15, delete "existing TM" and insert -- existing TAI --, therefor.

In Column 6, Line 15, delete "initial TM" and insert -- initial TAI --, therefor.

In Column 6, Line 64, delete "LT+P(M,S,N,AC,P)" and insert -- LT+P(M,S,N,AC,Pf) --, therefor.

In Column 8, Line 32, delete "TM" and insert -- TAI --, therefor.

In Column 8, Line 34, delete "TM" and insert -- TAI --, therefor.

In Column 8, Line 38, delete "TM" and insert -- TAI --, therefor.

In Column 8, Line 45, delete "TM" and insert -- TAI --, therefor.

In Column 8, Line 67, delete "TM" and insert -- TAI --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,071,951 B2

In Column 9, Line 1, delete "TM" and insert -- TAI --, therefor.

In Column 9, Line 4, delete "TM" and insert -- TAI --, therefor.

In Column 9, Line 6, delete "TM" and insert -- TAI --, therefor.

In Column 9, Line 7, delete "TM" and insert -- TAI --, therefor.

In Column 9, Line 54, delete "TM" and insert -- TAI --, therefor.

In Column 9, Line 64, delete "TM" and insert -- TAI --, therefor.

In Column 10, Line 23, delete "sending unit 41." and insert -- sending unit 43. --, therefor.

In Column 10, Line 47, delete "TM" and insert -- TAI --, therefor.

In Column 10, Line 58, delete "TM" and insert -- TAI --, therefor.

In Column 10, Line 65, delete "TM" and insert -- TAI --, therefor.

In Column 10, Line 67, delete "TM" and insert -- TAI --, therefor.

In Column 11, Line 11, delete "TM" and insert -- TAI --, therefor.

In Column 11, Line 15, delete "TM" and insert -- TAI --, therefor.

In Column 11, Line 17, delete "TM list." and insert -- TAI list. --, therefor.

In Column 11, Line 17, delete "TM was" and insert -- TAI was --, therefor.

In Column 11, Line 18, delete "TM in" and insert -- TAI in --, therefor.

In Column 11, Line 41, delete "TM" and insert -- TAI --, therefor.

In Column 11, Line 44, delete "TM" and insert -- TAI --, therefor.

In Column 11, Line 48, delete "TM" and insert -- TAI --, therefor.

In Column 11, Line 49, delete "associated TM" and insert -- associated TAI --, therefor.

In Column 11, Line 49, delete "TM of" and insert -- TAI of --, therefor.

In Column 11, Line 51, delete "TM" and insert -- TAI --, therefor.

In Column 11, Line 66, delete "TM" and insert -- TAI --, therefor.

CERTIFICATE OF CORRECTION (continued)
U.S. Pat. No. 9,071,951 B2

In Column 11, Line 67, delete "TM" and insert -- TAI --, therefor.

In Column 12, Line 22, delete "TM" and insert -- TAI --, therefor.

In Column 12, Line 29, delete "TM" and insert -- TAI --, therefor.

In Column 12, Line 32, delete "TM" and insert -- TAI --, therefor.

In Column 13, Line 5, delete "TM" and insert -- TAI --, therefor.

In Column 13, Line 27, delete "TM" and insert -- TAI --, therefor.

In Column 13, Line 29, delete "TM" and insert -- TAI --, therefor.

In Column 13, Line 36, delete "TM" and insert -- TAI --, therefor.

In Column 13, Line 40, delete "TM" and insert -- TAI --, therefor.

In Column 13, Line 41, delete "TM" and insert -- TAI --, therefor.

In Column 13, Line 46, delete "TM" and insert -- TAI --, therefor.

In Column 13, Line 56, delete "TM" and insert -- TAI --, therefor.

In Column 13, Line 67, delete "TM of" and insert -- TAI of --, therefor.

In Column 13, Line 67, delete "TM list" and insert -- TAI list --, therefor.

In Column 14, Line 37, delete "MMEs)" and insert -- MMEs)) --, therefor.

In Column 15, Line 19, delete "TM" and insert -- TAI --, therefor.

In Column 20, Line 1, in Claim 17, delete "The" and insert -- A --, therefor.

In Column 20, Line 44, in Claim 18, delete "according claim" and insert -- according to claim --, therefor.